July 25, 1950 J. H. MOORE 2,516,715
REPAIR VULCANIZER
Filed Dec. 28, 1946 3 Sheets-Sheet 1
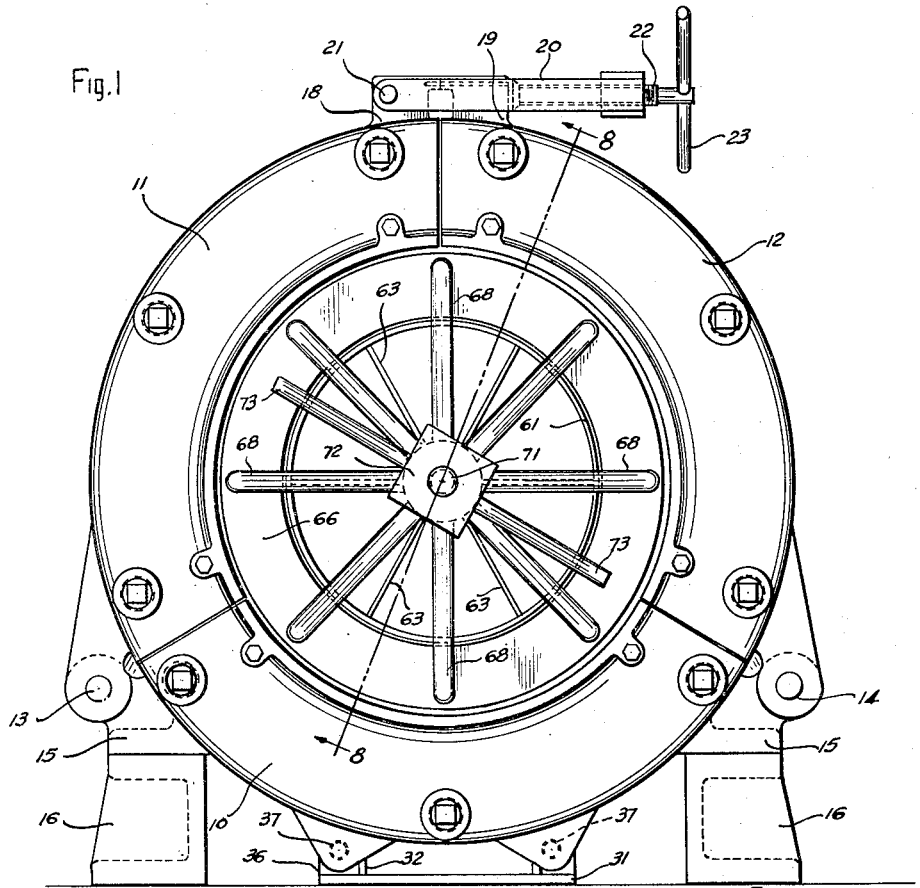
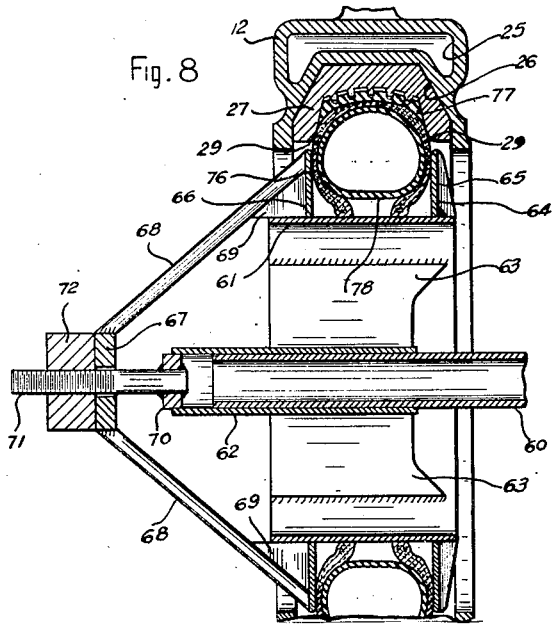
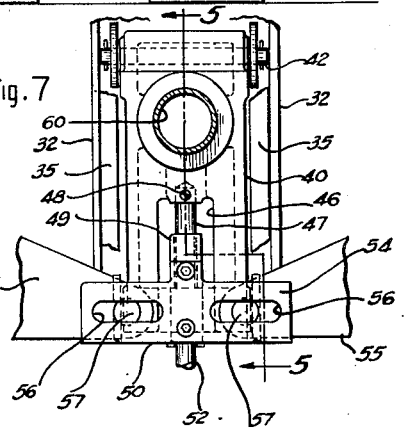
INVENTOR
JAMES H. MOORE
BY
ATTORNEYS

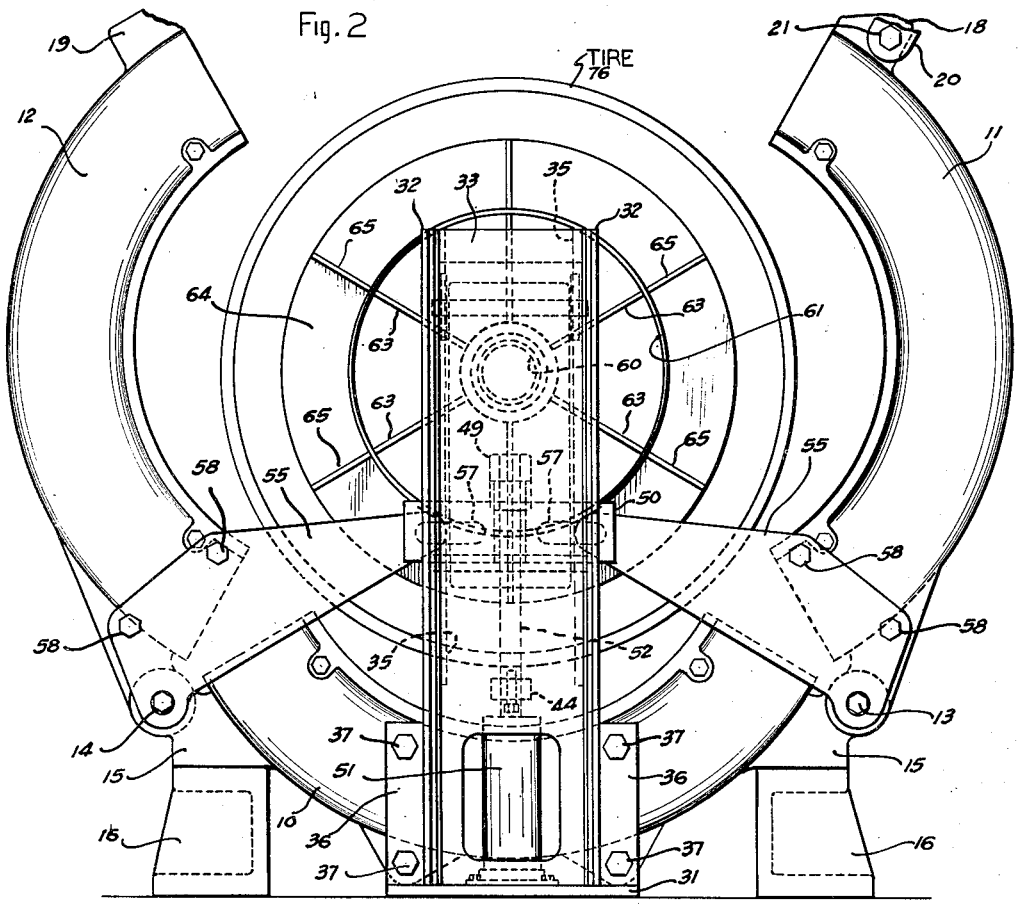

July 25, 1950  J. H. MOORE  2,516,715
REPAIR VULCANIZER
Filed Dec. 28, 1946  3 Sheets-Sheet 3
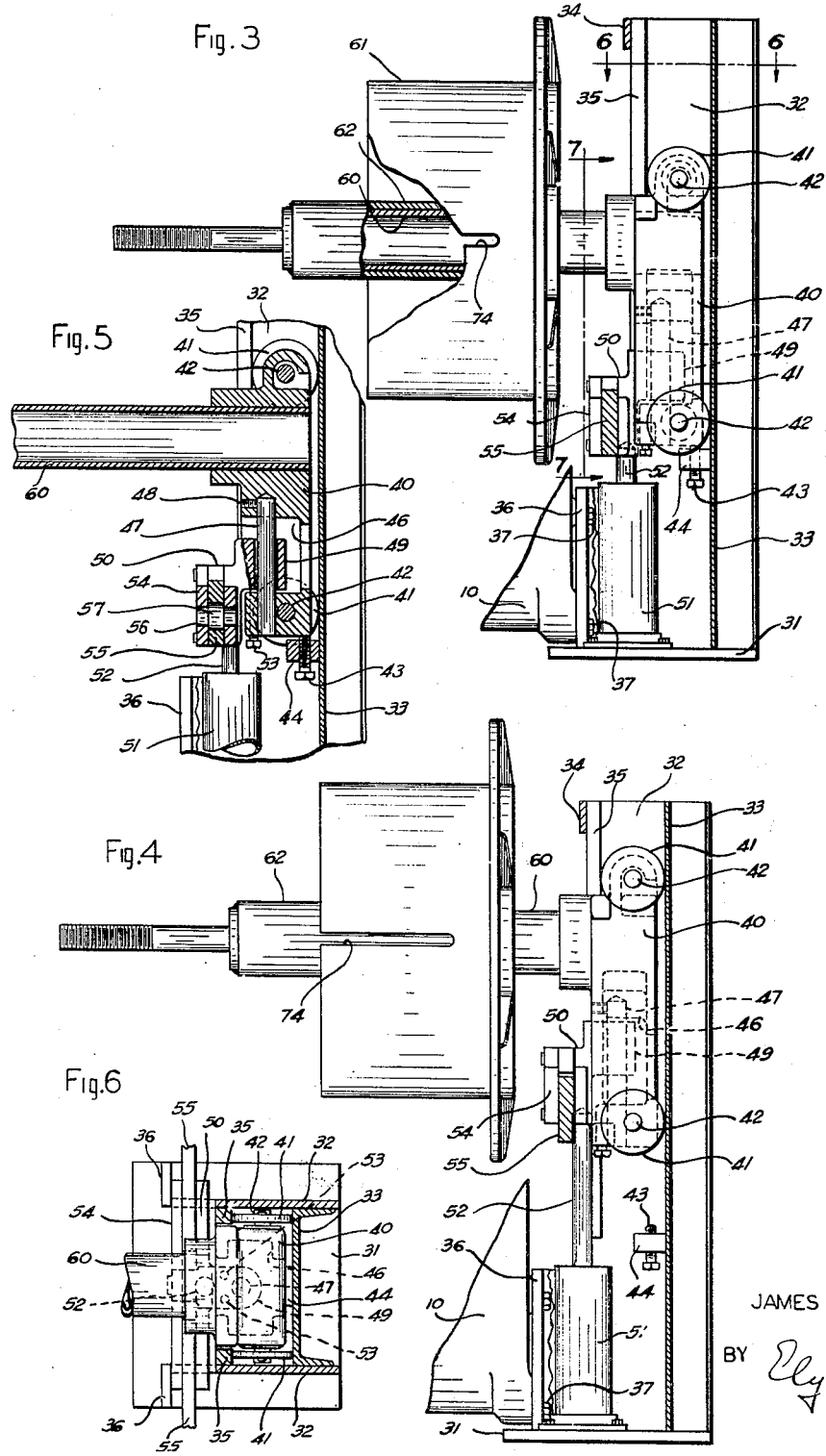
INVENTOR
JAMES H. MOORE
BY Ely & Frye
ATTORNEYS Patented July 25, 1950

2,516,715

UNITED STATES PATENT OFFICE 2,516,715

REPAIR VULCANIZER

James H. Moore, Akron, Ohio

Application December 28, 1946, Serial No. 719,003

8 Claims. (Cl. 18—18)

This invention relates to repair vulcanizers such as are employed for repairing pneumatic vehicle tires, and more especially it relates to vulcanizers for applying new treads or recaps to worn vehicle tire casings.

Repair vulcanizers of the character mentioned require the use of a full circle mold structure, which structure is sectional to permit opening and closing thereof so that work may be mounted therein and removed therefrom. In some cases the mold structure is divided in its central plane, as in the "watchcase" type of vulcanizer, and in other cases the mold structure is divided on radial lines into a plurality of segments. Both types of mold structures, as heretofore provided have not been entirely satisfactory due to the fact that frequently, in closing, they pinch the tread stock of a tire therein, sometimes loosening the same from the tire carcass. Furthermore, repair vulcanizers of the character mentioned as previously constituted usually have employed a tire rim or other bead-engaging instrumentalities for mounting the tire and expansible core therein. Such vulcanizers consumed time and labor for mounting the tire on the rims and dismounting them therefrom, and made it impossible to shift the bead portions of the tires for any purpose.

The chief objects of this invention are to provide an improved repair vulcanizer of the character mentioned; to avoid off-center treads; to obviate unsightly side-wall marks on recapped tires; and to facilitate the removal of finished tires from the vulcanizer. More specifically, the invention aims to provide a tire repair vulcanizer wherein a tire automatically centers itself as the vulcanizer closes; and to provide mechanically for breaking the finished tire tread away from the mold surface automatically as the vulcanizer is opened; and in general to produce superior recapped tires, at a faster rate, and at lower cost. Other objects will be manifest as the description proceeds.

Of the accompanying drawings:

Fig. 1 is a front elevation of a vulcanizer embodying the invention, in closed or operative position;

Fig. 2 is a rear elevation thereof in open or inoperative position, and a tire therein;

Fig. 3 is a detail side elevation of the operating mechanism of the invention exclusive of the sectional vulcanizer structure, in one position of operation, parts being broken away and in section.

Fig. 4 is a view similar to Fig. 3, the parts thereof being in their alternative position of operation;

Fig. 5 is a section on the line 5—5 of Fig. 7;

Fig. 6 is a section on the line 6—6 of Fig. 3;

Fig. 7 is a section on the line 7—7 of Fig. 3;

Fig. 8 is a diametric section on line 8—8 of Fig. 1 through the closed vulcanizer, and work therein, prior to the distension of the expansible core within the work; and Fig. 9 is a section similar to Fig. 8 showing the position of the work when the expansible core therein is distended.

Referring to the drawings, it will be seen that the vulcanizer per se of the apparatus comprises a segmental structure consisting of an arcuate fixed segment 10 and arcuate movable segments 11, 12 respectively that are hinged to said fixed segment at respective hinge points 13, 14, said segments, when closed in end to end relation defining a full circle. The fixed segment 10 is arranged to constitute the base of the vulcanizer, and is formed at opposite ends with lugs 15, 15 that rest upon suitable legs or supports 16, 16 to which they are secured in any desired manner.

The vulcanizer segments are arranged to be locked in closed relation, and to this end the free ends of movable segments 11, 12 are formed on the periphery thereof with respective radially outwardly extending lugs 18, 19. As is shown in Fig. 1, a C-shaped yoke 20 has the ends of its respective legs pivotally secured to the lug 18 at 21. The medial region of said yoke has a screw 22 threaded therethrough, which screw has a cross-piece 23 on an end thereof by which it may be rotated manually. In the locked position of the vulcanizer the yoke 20 is swung to the position wherein it straddles the lug 19, the screw 22 being set up tightly against lug 19, with the result that lugs 18, 19 are drawn into abutting relation and so held. This prevents spreading apart of the vulcanizer sections as the result of fluid pressure in the expansible core in the tire being processed in the apparatus.

The vulcanizer segments are steam jacketed, that is, each includes an internal steam chamber therein as shown at 25, Figs. 8 and 9. Said steam chambers are interconnected with each other by suitable piping (not shown), and are connected to suitable steam inlet and drain pipes (not shown) as is conventional practise in this art. The vulcanizer segments are deeply recessed circumferentially on their concave sides, as indicated at 26, Figs. 8 and 9, and received in said recesses are respective mold matrices 27 that are secured in place in any suitable or preferred manner. The inner or concave face of each matrix is formed with the usual ribs, grooves, or other formations that enable the mold to produce the desired tread characters on a tire processed therein. The molding surfaces of the matrices 27 are rounded at the lateral edges thereof, as indicated at 29, so as not to mark the side walls of a tire being recapped in the mold.

Power means is provided for swinging the movable vulcanized segments 11, 12 between the closed condition of the vulcanizer shown in Fig. 1 and the open position thereof shown in Fig. 2. To this end a base plate 31 is mounted on the floor behind the previously described vulcanizer, and rising from said base plate is a frame structure which, as best shown in Fig. 6, comprises a pair of parallel side plates 32, 32, and a channeled rear plate 33 that is welded or otherwise secured to plates 32 to reinforce the same. A narrow tie-plate 34 connects the plates 32 at the top and front thereof. The front of the frame structure is open and confronts the vulcanizer, the axis of the latter being disposed in the central vertical plane of the frame structure. Secured to the confronting faces of the side plates 32, at the front margins thereof, are respective rails or guides 35 that extend from the top of the frame structure to a point about one foot from the bottom thereof. The side plates 32 are somewhat wider at the lower region thereof, and have wing-portions 36 attached to their respective front margins, said wing-portions being secured to vulcanizer segment 10 by means of cap screws 37, Fig. 2.

The frame structure described constitutes a guideway for a carriage 40 that has wheels 41, 41 at opposite sides thereof at its upper and lower ends, said wheels being mounted on the opposite ends of journal pins 42 that are carried by the carriage. The wheels 41 are confined between the rear plate 33 and the rails or guides 35 of the side plates 32. Power operated means presently to be described is provided for raising and lowering the carriage 40. The lowermost limit of carriage movement is determined by an adjustable stop, herein shown as a screw 43 that is threaded through a lug 44 that projects forwardly from the rear plate 33 of the frame structure.

The lower portion of the carriage 40 is formed with a relatively large central opening 46 that extends from front to rear thereof, and traversing said opening, in the central plane of the carriage, is a vertically positioned guide rod 47 that is retained in position by a set screw 48. Slidably engaging the guide rod 47 is an apertured ear 49 that is formed integral with and extends rearwardly from a cam block 50 that is located in front of the carriage 40. The ear 49 is of less height than the carriage-opening 46 in which it is located, the arrangement being such that said ear, and cam block 50, may move vertically to a determinate extent relatively of said carriage. For effecting vertical reciprocation of the cam block 50 a fluid pressure operated cylinder 51 is provided, which cylinder rests with its lower end upon the base plate 31, in the central vertical plane of the frame, the piston rod 52 of the cylinder extending upwardly therefrom and having its outer end connected to the bottom of the cam block 50 in any suitable manner. The cylinder 51 is single acting, and preferably is of the air-hydraulic type wherein air is utilized to displace a body of liquid, such as oil, with the result that slow, steady charging of the cylinder may be effected.

The stroke of the piston rod 52 of cylinder 51 is greater than the distance that the height of carriage opening 46 exceeds the height of cam-block-ear 49. Thus if we assume that the cylinder 51 is discharged and carriage 40 and cam block 50 are in the lowered position shown in Figs. 3, 5 and 7, with the carriage resting upon adjustable stop 43, it will be apparent that upon the charging of the cylinder and lifting of the piston rod 52, the cam block 50 first will move upwardly relatively of the carriage 40 until the ear 49 strikes the top of carriage opening 46, whereupon the cam block will lift the carriage and both will move upwardly together for the remainder of the stroke of the piston rod. At the upper limit of such stroke the cam block and carriage are in the relative positions shown in Figs. 2 and 4. The movements described are reversed when the cylinder 51 is discharged, the cam block and carriage descending together until the latter strikes the stop 43. The cam block thereafter continues to descend until its ear 49 comes to rest against a pair of adjustable screws 53, Figs. 5 and 6, that are threaded through the lower end of the carriage and extend into opening 46 thereof. The arrangement provides for determinate lost motion between the movements of cam block and carriage, which lost motion may be varied as desired, and advantageously is utilized in the loading and unloading of the vulcanizer as presently will be explained.

The cam block 50 has a face plate 54 secured to the front thereof, the lateral portions of cam block being recessed behind the face plate to provide spaces in which the free end portions of respective lever arms 55 are received. The said end portions of the lever arms have respective cam rollers 56 journaled therein, which cam rollers have flattened extremities that extend into respective horizontal cam slots 57 formed in the respective lateral portions of the cam block and in the face plate 54 overlying the same. As is best shown in Fig. 2, one of the lever arms 55 is secured to the rear face of the movable vulcanizer segment 11 by cap screws 58, 58 and pivotally mounted at hinge point 13. In like manner the other lever arm 55 is secured to the rear face of movable vulcanizer segment 12 and pivotally mounted at hinge point 14. When the cylinder 51 lifts the cam block 50 from the position shown in Figs. 3, 5 and 7 to the position shown in Figs. 2 and 4, it moves the unlocked vulcanizer segments 11, 12 from the closed position shown in Fig. 1 to the open position shown in Fig. 2. The operation is reversed when the cylinder is discharged to effect lowering of the cam block.

The function of the carriage 40 is to support the work as it is being mounted in the vulcanizer and to position the work concentrically of the axis of the vulcanizer; after the vulcanizing operation is completed, the carriage breaks the work away from the molding matrix in fixed vulcanizer segment 10, and lifts the work to a position from where it easily is removed. To this end the carriage 40 is provided with a tubular horizontal spindle 60 that extends forwardly well past the central plane of the vulcanizer segments, as shown in Figs. 8 and 9. The spindle 60 supports an annular drum 61 that has a tubular hub portion 62, and radial ribs or webs 63, 63 connecting said drum and said hub portion. The drum hub 62 is journaled upon the spindle 60, and also is capable of axial movement relatively thereof. Adjacent the rear margin of the drum 61 a vertical plate or flange 64 is permanently mounted upon the periphery thereof, said plate being reinforced against lateral thrust by webs or buttresses 65 that engage the rearwardly presented face thereof. As shown, the buttresses 65 are in radial alignment with the webs 63 although this arrangement is not essential. A plate 66, similar to plate 64 and referred to as a "pressure plate," is removably mountable upon the periphery of drum 61, and is capable of easy sliding movement thereon, toward and away from the plate 64. The outside diameter of plates 64, 66 is slightly less than the inside diameter of vulcanizer segments 10, 11 and 12. For moving the pressure plate 66 toward plate 64, an axially apertured collar 67 is provided, which collar is disposed concentrically of the pressure plate, and in a plane that is a substantial distance in front of the plane of said plate. A series of struts 68 are permanently secured to the collar 67 and extend obliquely and radially therefrom to the pressure plate 66 where their outer ends are permanently secured to the front face of said plate, near the periphery thereof. The struts 68 preferably are tubular to reduce the weight thereof, and reinforcing webs 69 may be mounted in the interior angle at the juncture of the respective struts and the pressure plate. The hub portion 62 of the drum extends a substantial distance forwardly of the front margin of the drum, and has a closure 70 permanently secured in its front end, which closure carries a forwardly projecting threaded stud 71, the latter disposed at the axis of the drum. The collar 67 is receivable upon the stud 71 with which it has an easy sliding fit. A nut 72 is threaded upon the stud 71, said nut being provided with radially extending arms 73 that may be grasped to effect manual turning of the nut. When the nut 72 is set upon the stud 71 against the collar 67 thereon, the pressure plate 66 is urged laterally, axially of the drum, toward the plate 64 on the opposite side of the drum. The drum 61 is slotted at 74 to receive the usual inflation stem (not shown) of an expansible core that is provided for distending a tire mounted on said drums.

A tire to be recapped in the vulcanizer of the invention is located upon the drum 61, the periphery of which is slightly smaller in diameter (about ⅛ inch) than the inside diameter of the tire. Such a tire is best shown in Figs. 8 and 9 of the drawings wherein 76 designates the tire proper, 77 designates the "camelback" or retread stock on the crown thereof, and 78 designates the expansible core or tube located interiorly of the tire. The tire 76 is mounted upon the drum while the vulcanizer is in the open position shown in Fig. 2, and the pressure plate 66 is removed from the drum. At this time the carriage 40 that carries the spindle 60 that mounts the drum is in elevated position, so that the tire easily is moved axially of the drum without obstruction from the vulcanizer segments, particularly fixed segment 10. The tire is passed over the drum until its rear side wall abuts the plate 64, after which the pressure plate 66 is mounted on the drum, the nut 72 is threaded onto stud 71, and is set up thereon until the pressure plate engages the front side-wall of the tire 76. It will be observed that due to the curvature of the side walls of the tire, the plates 64, 66 are disposed tangentially thereof, relatively remote from the bead portions of the tire, which are at the inner circumference thereof.

With a tire mounted on the drum as described, the next step in the operation of the apparatus is the closing of the vulcanizer. This is effected by the discharging of cylinder 51 to retract the piston rod 52 thereof from the position shown in Figs. 2 and 4 to the position shown in Figs. 3, 5 and 7. As the piston rod descends the carriage 40, supported upon cam block 50, descends with it and thus lowers the drum 61 with the tire 76 thereon. Descent of the carriage 40 continues until arrested when the periphery of the tire 76 rests in the molding matrix 27 in segment 10 of the vulcanizer. However, the axis of the drum 61 may not yet be coincident with the axis of the vulcanizer and the carriage 40 may still be somewhat above the adjustable stop 43. Descent of the cam block 50 swings the lever arm 55 from the position shown in Fig. 2 toward the position shown in Fig. 7, with the result that movable vulcanizer segments 11 and 12 are swung about their pivot points 13, 14 toward their closed positions shown in Fig. 1. Before segments 11, 12 reach their closed positions aforementioned, the ear 49 of cam block 50 has traversed the lost motion opening 46 in carriage 40 and engages the adjustment screws 53 in the bottom thereof, with the result that the carriage 40 is forced downwardly to the lower limit of its movement as determined by the stop screw 43. When the carriage 40 is in its lowermost position, the axis of the spindle 60 and drum 61 thereon is coincident with the axis of the vulcanizer. The final downward movement of the carriage also forces the tire 76 against the matrix 27 in vulcanizer segment 10 with sufficient pressure to cause the ribs or other tread formations on this matrix to be forced somewhat into the soft stock of the recap structure 77 on the periphery of the tire. Engagement of the carriage with abutment 43 also arrests the descent of the cam block 50, in which position of the latter the movable vulcanizer segments 11, 12 are substantially in the fully closed positions shown in Fig. 1. The yoke 20 is then swung to the position shown in Fig. 1, and the screw 22 set up tightly against lug 19 to force the free ends of the segments 11, 12 together, and to hold them thus against the pressure of heated vulcanizing fluid subsequently admitted to the expansible core 78. As the segments 11, 12 are forced to their extreme closed positions, the engraved formations in the matrices 27 in the segments are impressed somewhat into the soft recap stock 77 on the tire. Because the tire at this time is disposed concentric with the axis of the vulcanizer, possibility of pinching the tread at the juncture of segments 11, 12 practically is eliminated, as well as the possibility of loosening the tread from the tire.

Another important feature of the invention is the automatic centering of the tire 76 so that the central plane of the tire is coincident with the central plane of the vulcanizer and molding matrices in the closed condition of the vulcanizer. This function of the apparatus is effected by reason of the axial movability of the drum 61 on the supporting spindle 60. Thus a tire laterally offset from the central plane of the vulcanizer will have its outer peripheral region engaged first by one side or the other of the matrix cavities as the vulcanizer closes, and urged laterally thereby. The tire as a whole is enabled to move laterally under such impetus by reason of the mobility of the drum 61, such movement of tire and drum continuing until pressure on opposite sides of the tire is equalized, at which time the central plane of the tire will be coincident with the central plane of the matrices.

After the vulcanizer is closed as described, the expansible core 78 is inflated and distended by heated vulcanizing fluid under pressure admitted thereto through the usual inflation stem (not shown). Such distension of the core 78 changes the condition of the tire from that shown in Fig. 8 to that shown in Fig. 9, whereby the periphery of the tire is moved radially outwardly so that the material of the recap structure 77 is forced into the tread characters formed in the molding matrices 27. The radially outward movement of the tire tread is due only in part to the radially outward pressure of the expanding core 78, a substantial part of said outward movement being the result of forces applied laterally against the side walls and bead portions of the tire. This phenomenon will be understood by noting that the bead portions of the tire are unrestrained against lateral movement, and that the side walls of the tire outwardly from said bead portion have substantial curvature. Thus when the expansible core 78 is inflated, it distends radially inwardly so as to fill the space between the toes of the tire beads, and urges said beads laterally, apart from each other. Since the side walls of the tire are restrained against lateral movement by the plates 64, 66 and the matrices 27, such lateral movement of the bead portions of the tire results in a reduction or flattening of the curvature of the side walls above the beads, as will be apparent from a comparison of Fig. 9 with Fig. 8. Since the beads of the tire bear against the drum 61, the flattening of the curvature of the side walls results in the creation of forces that are transmitted radially outwardly, through the respective side walls, to the tread region of the tire. These forces, which are in the nature of those arising from a toggle action, assist materially in forcing the recap structure 77 into the recesses of the molding matrices, with the result that the recapping operation requires substantially less pressure in the expansible core 78 than has been required in prior practise. It will be understood that the vulcanizer segments are constantly heated through the agency of their steam chambers 25, so that vulcanization of the recap structure on the tire commences as soon as the vulcanizer is closed and the expansible core inflated.

When vulcanization is completed, the expansible core is evacuated, and the screw 22 is loosened and the yoke 20 disengaged from the vulcanizer segment 12, after which the cylinder 51 is charged to effect opening of the vulcanizer. As piston 52 of the cylinder rises it first moves cam block 50 upwardly, relatively of carriage 40, to initiate opening of the vulcanizer and thus to pull the molding matrices in vulcanizer segments 11 and 12 away from the tire 76. As soon as the lost motion between cam block and carriage is taken up, the latter starts to rise, with the result that its spindle 60 is moved upwardly and with it the drum 61 thereon with the result that the tire is broken away from the molding matrices in fixed vulcanizer segment 10. When the cylinder 51 is fully charged, the vulcanizer segments are in fully open position and the tire 76 in the elevated position shown in Fig. 2. The nut 72 may then be threaded off the stud 71 and the pressure plate 66 removed from the drum, after which the finished tire, with core 78 therein, may be removed from the vulcanizer simply by sliding it axially off the drum. This completes a cycle of operations which may be repeated as often as desired.

The advantages inherent in the invention are manifold. The use of the adjustable pressure plate obviates the need for spacer rings; it also obviates measuring of tires and allows for growth and size variations in different makes of tires. The tire automatically centers itself laterally in the vulcanizer, thereby obviating off-center treads. No labor is required to break the tire loose from the vulcanizer, this being effected mechanically and automatically, and the tire raised to a position where it is easily removed from the drum. Tires processed in the vulcanizer of the invention have a factory-like finish, and there are no unsightly sidewall marks thereon. Furthermore, the possibility of producing defective tires due to pinched or loosened treads is avoided. The vulcanizer is compact and relatively small, thus conserving floor space. The invention not only saves time, space, and labor, but produces a superior product faster and at lower cost than heretofore has been possible.

Modification may be resorted to without departing from the spirit of the invention or the scope thereof as defined by the appended claims.

What is claimed is:

1. In apparatus of the character described, the combination of an arcuately segmental vulcanizer defining a full circle in closed condition, said vulcanizer being of slight axial extent relatively to its diameter, in closed position, so as to be coextensive axially with the articles to be treated, a carriage adjacent the vulcanizer and movable parallel to the plane thereof, a spindle carried by said carriage and projecting therefrom through the vulcanizer normal to the plane thereof, a drum on said spindle adapted to mount a rubber tire to be processed in the vulcanizer, power operated means for opening and closing the vulcanizer, and means operatively connecting the last mentioned means to the carriage for effecting the said movement of the latter.

2. A combination as defined in claim 1 wherein the means connecting the power operated means to the carriage is a lost motion connection arranged to effect movement of the carriage in timed relation to movement of the power operated means.

3. A combination as defined in claim 1 wherein the drum is mounted for axial sliding movement relatively of the carriage spindle.

4. In apparatus of the character described, the combination of an annular vulcanization structure disposed in a vertical plane and comprising segments of which the lowermost is fixed and has movable segments hingedly mounted upon the respective ends thereof, a frame behind the vulcanizer structure, a carriage arranged for vertical movement within said frame, a spindle projecting horizontally forwardly from said carriage through the vulcanizer structure, a drum on said spindle adapted to support a rubber tire to be processed in said vulcanizer, a cam block, a prime mover adapted to raise and lower the same, connections between the cam block and the respective movable vulcanizer segments for swinging the latter on their hinges to open and close the vulcanizer as the cam block is raised and lowered respectively, and a lost motion connection between the cam block and carriage for effecting vertical movement of the latter as the cam block is raised and lowered.

5. A combination as defined in claim 4 including a stop limiting downward movement of the carriage at a point where the spindle and drum are concentric with the axis of the vulcanizer structure.

6. A combination as defined in claim 4 wherein the lost motion connection between the cam block and carriage comprises an ear formed on the cam block and projecting therefrom into an opening formed in the carriage, said opening being of greater vertical extent than the vertical dimension of the ear.

7. A combination as defined in claim 4 wherein the lost motion connection between the cam block and carriage comprises an ear formed on the cam block and projecting therefrom into an opening formed in the carriage, said opening being of greater vertical extent than the ear so that the latter may be raised and lowered relatively of the carriage, including adjustable means extending into said opening and engageable with the ear in one position thereof to limit determinately the lost motion between cam block and carriage.

8. A repair vulcanizer of the character described comprising a cylindrical drum adapted to support a rubber tire on the periphery thereof, said drum having an axial hub, spaced apart flat plates located on the drum and extending radially of the periphery thereof adapted to engage the sidewalls only of said tire, at regions spaced radially outwardly from the bead portions of the tire, said plates being the sole contacting means laterally of the tire, one of said plates being unattached and the other permanently attached to the drum, a threaded stem projecting axially from the hub of the drum, a member loose on said stem connected by radial ribs to said unattached plate, a nut threaded onto said stem and engageable with the said member for moving the unattached plate relatively of the fixed plate on the drum, an annular segment vulcanizer structure surrounding the drum, an axial support for the drum, the latter being capable of rotary and axial movement relatively of said support, and means for moving said support to carry the drum into and out of concentricity with the vulcanizer structure.

JAMES H. MOORE.

REFERENCES CITED

The following references are of record in the file of this patent:

UNITED STATES PATENTS

| Number | Name | Date |
|---|---|---|
| 1,836,850 | Hudson | Dec. 15, 1931 |
| 1,909,574 | De Mattia | May 16, 1933 |
| 1,969,217 | Haiss | Aug. 7, 1934 |
| 1,989,364 | Iverson | Jan. 29, 1935 |
| 1,996,971 | Murphy | Apr. 9, 1935 |
| 2,227,798 | Rihn et al. | Jan. 7, 1941 |
| 2,372,644 | Bacon | Apr. 3, 1945 |
| 2,456,063 | James | Dec. 14, 1948 |